United States Patent
Patel

(10) Patent No.: US 8,513,915 B2
(45) Date of Patent: Aug. 20, 2013

(54) VEHICLE ALIGNMENT FOR INDUCTIVE CHARGING

(75) Inventor: Vipul M. Patel, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 433 days.

(21) Appl. No.: 12/909,243

(22) Filed: Oct. 21, 2010

(65) Prior Publication Data

US 2012/0098483 A1    Apr. 26, 2012

(51) Int. Cl.
*H02J 7/00* (2006.01)

(52) U.S. Cl.
USPC ............ 320/108; 320/115; 320/119; 701/300

(58) Field of Classification Search
USPC ..................... 320/108, 119, 115; 701/300
See application file for complete search history.

(56) References Cited

U.S. PATENT DOCUMENTS

| | | | |
|---|---|---|---|
| 5,461,298 A * | 10/1995 | Lara et al. | 320/109 |
| 5,498,948 A | 3/1996 | Bruni | |
| 5,617,003 A | 4/1997 | Odachi et al. | |
| 5,982,139 A * | 11/1999 | Parise | 320/109 |
| 6,525,510 B1 * | 2/2003 | Ayano et al. | 320/109 |
| 7,068,991 B2 * | 6/2006 | Parise | 455/343.1 |

* cited by examiner

*Primary Examiner* — Samuel Berhanu
(74) *Attorney, Agent, or Firm* — Cantor Colburn LLP

(57) ABSTRACT

Vehicle alignment for inductive charging includes a control system and logic configured to execute on the control system. The logic is configured to define a first orientation for a first antenna and a second antenna, which are disposed on a vehicle. The logic is also configured to define a second orientation specifying a location of a vehicle charging device disposed on the vehicle relative to the first and second antennae. The logic is further configured to determine a location of an inductive charging device relative to the vehicle by performing triangulation analysis using data from the first and second orientations in conjunction with signals received from the first and second antennae. The logic is also configured to calculate a direction to the location using voltage values from the signals, such that movement of the vehicle in the direction brings the vehicle charging device closer to the inductive charging device.

20 Claims, 2 Drawing Sheets

VEHICLE ALIGNMENT FOR INDUCTIVE CHARGING

FIELD OF THE INVENTION

The subject invention relates to inductive charging of vehicles and, in particular, to vehicle alignment for inductive charging.

BACKGROUND

In inductive charging applications, an inductive charging coil is placed in a location, typically under the floor, and an electric vehicle is guided toward the location so that electromagnetic energy dispersed through the floor is received by an inductive charging device on the vehicle, which then converts the energy to electricity used to power and recharge the vehicle's battery. As the electromagnetic energy is conveyed wirelessly through the air, it is important that the vehicle be properly aligned over the inductive charging coil in the floor to ensure maximum power transfer between the inductive charging coil and the vehicle's inductive charging device. In addition, such alignment would enable faster charging, as well as reduced energy wastage.

Accordingly, it is desirable to provide a means to ensure proper alignment between a vehicle's inductive charging device and an inductive charging device that provides the power transfer to the vehicle's inductive charging device.

SUMMARY OF THE INVENTION

In one exemplary embodiment of the present invention, a system for vehicle alignment for inductive charging is provided. The system includes a control system and logic configured to execute on the control system. The logic is configured to define a first orientation for a first antenna and a second antenna, which are disposed on a vehicle. The logic is also configured to define a second orientation specifying a location of a vehicle charging device disposed on the vehicle relative to the first and second antennae. The logic is further configured to determine a location of an inductive charging device relative to the vehicle by performing triangulation analysis using data from the first and second orientations in conjunction with signals received from the first and second antennae. The logic is also configured to calculate a direction to the location using voltage values from the signals, such that movement of the vehicle in the direction brings the vehicle charging device closer to the inductive charging device.

In another exemplary embodiment of the present invention, a method of vehicle alignment for inductive charging is provided. The method includes defining a first orientation for a first antenna and a second antenna, which are disposed on a vehicle. The method also includes defining a second orientation specifying a location of a vehicle charging device disposed on the vehicle relative to the first and second antennae. The method further includes determining a location of an inductive charging device relative to the vehicle by performing triangulation analysis using data from the first and second orientations in conjunction with signals received from the first and second antennae. The method also includes calculating a direction to the location using voltage values from the signals, such that movement of the vehicle in the direction brings the vehicle charging device closer to the inductive charging device.

In yet another exemplary embodiment of the present invention, a computer program product for vehicle alignment for inductive charging is provided. The computer program product includes a storage medium with instructions encoded thereon, which when executed by a computer cause the computer to implement a method. The method includes defining a first orientation for a first antenna and a second antenna, which are disposed on a vehicle. The method also includes defining a second orientation specifying a location of a vehicle charging device disposed on the vehicle relative to the first and second antennae. The method further includes determining a location of an inductive charging device relative to the vehicle by performing triangulation analysis using data from the first and second orientations in conjunction with signals received from the first and second antennae. The method also includes calculating a direction to the location using voltage values from the signals, such that movement of the vehicle in the direction brings the vehicle charging device closer to the inductive charging device.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
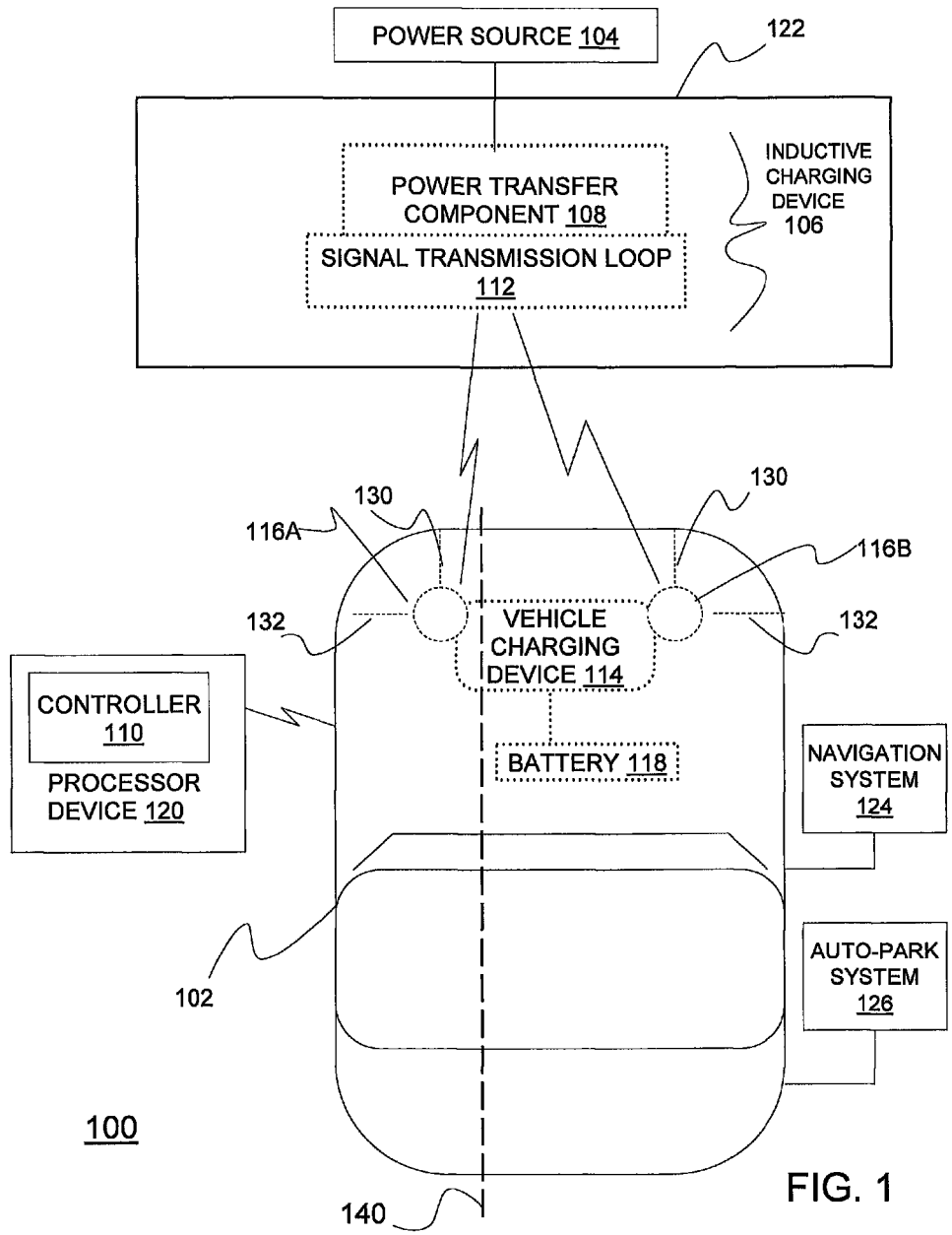
FIG. 1 is a diagram depicting a system upon which vehicle alignment for inductive charging may be implemented in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, vehicle alignment for inductive charging is provided. The exemplary vehicle alignment for inductive charging processes utilize orientation information from two or more antennae disposed on a vehicle in relation to a vehicle charging device that is also disposed on the vehicle to determine a relative location of an inductive charging device. The relative location is then used to guide the vehicle toward the inductive charging device, and as close as possible to the inductive charging device, in order to realize maximum possible power transfer between the inductive charging device and the vehicle charging device. Triangulation analysis is used to determine the location of the inductive charging device by acquiring reference data from signals provided by the two or more antennae, and applying the reference data to the known orientation information. Triangulation analysis includes measuring the distance of two points with respect to a third point and calculating angle measurements from this data. The location is derived from these measurements.

Turning now to FIG. 1, a system 100 upon which vehicle alignment for inductive charging may be implemented will now be described. The system 100 of FIG. 1 includes a vehicle 102, an inductive charging device 106, and a processor device 120.

The vehicle is an electric vehicle or a hybrid electric vehicle that includes an inductive vehicle charging device 114 communicatively coupled to a rechargeable battery 118. The inductive vehicle charging device 114 may include a coil communicatively coupled to wireless signal transmission components 116A and 116B (also referred to herein as 'antennae') for receiving electromagnetic energy that is converted to electrical energy for use by the battery 118. In an exemplary embodiment, the wireless signal transmission components 116A and 116B are transmission loop antennae.

In an exemplary embodiment, the inductive charging device 106 resides in a fixed location (i.e., it is stationary). The inductive charging device 106 may be disposed under a floor 122, whereby the electromagnetic energy is transmitted wirelessly from the inductive charging device 106 through the floor 122 to the vehicle charging device 114 on the vehicle 102 when the vehicle charging device 114 is in range of the electromagnetic energy. A power source 104 is communicatively coupled to the inductive charging device 106 and supplies electrical power thereto. The inductive charging device 106 includes a power transfer component 108 and a signal transmission loop 112. The power transfer component 108 includes a coil that provides an inductive charge through electromagnetic radiation dispersed from the energy produced through the coil via the power source 104. The signal transmission loop 112 transmits signal data received from the antennae 116A and 116B to the processor device 120 for use by the controller 110, as will be described further herein. While shown and described as a loop antenna, it will be understood that alternative low frequency wireless transmission components may be used (e.g., a radio frequency identification (RFID) chip may be employed in lieu of the signal transmission loop 112).

In the alignment process, intermittent signals (e.g., pulses) are discharged by the signal transmission loop 112 and received by the antennae 116A and 116B. Once the vehicle 102 is determined to be aligned, the control system 110 directs the inductive charging device 106 (e.g., via the power transfer component 108) to initiate inductive charging, which results in a steady, continuous electromagnetic signal discharge from the power transfer component 108. It will be understood by those skilled in the art, that the power transfer component 108 and the signal transmission component 112 may be integrated as a single device, e.g., a loop antenna that is configured to provide both the signal pulse used in the alignment, as well as the continuous signals used in the inductive charging process.

The vehicle 102 includes directional components for signaling left and right turns (not shown). The vehicle 102 may also include a navigation system 124 (e.g., a global positioning system (GPS)) and/or advanced features, such as an auto-park system 126.

In an exemplary embodiment, the processor device 120 includes a computer processor and a controller 110. The computer processor includes hardware elements (circuitry, logic cores, registers, etc.) for processing data configured to implement the exemplary vehicle alignment method described herein. The controller 110 may be implemented in hardware, software, or a combination thereof. The processor device 110 may be disposed on-board the vehicle 102 or may reside remotely from the vehicle 102. If the processor device 110 resides remotely from the vehicle 102, the processor device 110 is configured to be logically addressable by the vehicle 102 (e.g., over a network (not shown)). In an exemplary embodiment, the controller 110 executes logic for implementing the exemplary vehicle alignment processes described further in FIG. 2.

The antennae 116A and 116B are disposed on the vehicle 102. The antennae 116A and 116B receive signals from the signal transmission component 112 of the inductive charging device 106. A physical orientation of the antenna 116A to the antenna 116B on the vehicle 102 is defined according to their placement on the vehicle 102. In addition, an orientation of the antennae 116A and 116B to the vehicle charging device 114 is defined. The controller 110 may store or otherwise access this orientation information to determine a location of the inductive charging device 106 relative to the vehicle charging device 114. In an exemplary embodiment, this determination is performed using triangulation analysis using the signals received by the antennae 116A/116B in conjunction with the orientation information. The location of the inductive charging device 106 is used to calculate a direction in which the vehicle 102 is guided in order to physically align the vehicle charging device 114 with the inductive charging device 106. These and other features of the exemplary vehicle alignment for inductive charging processes will now be described.

Figure 2:
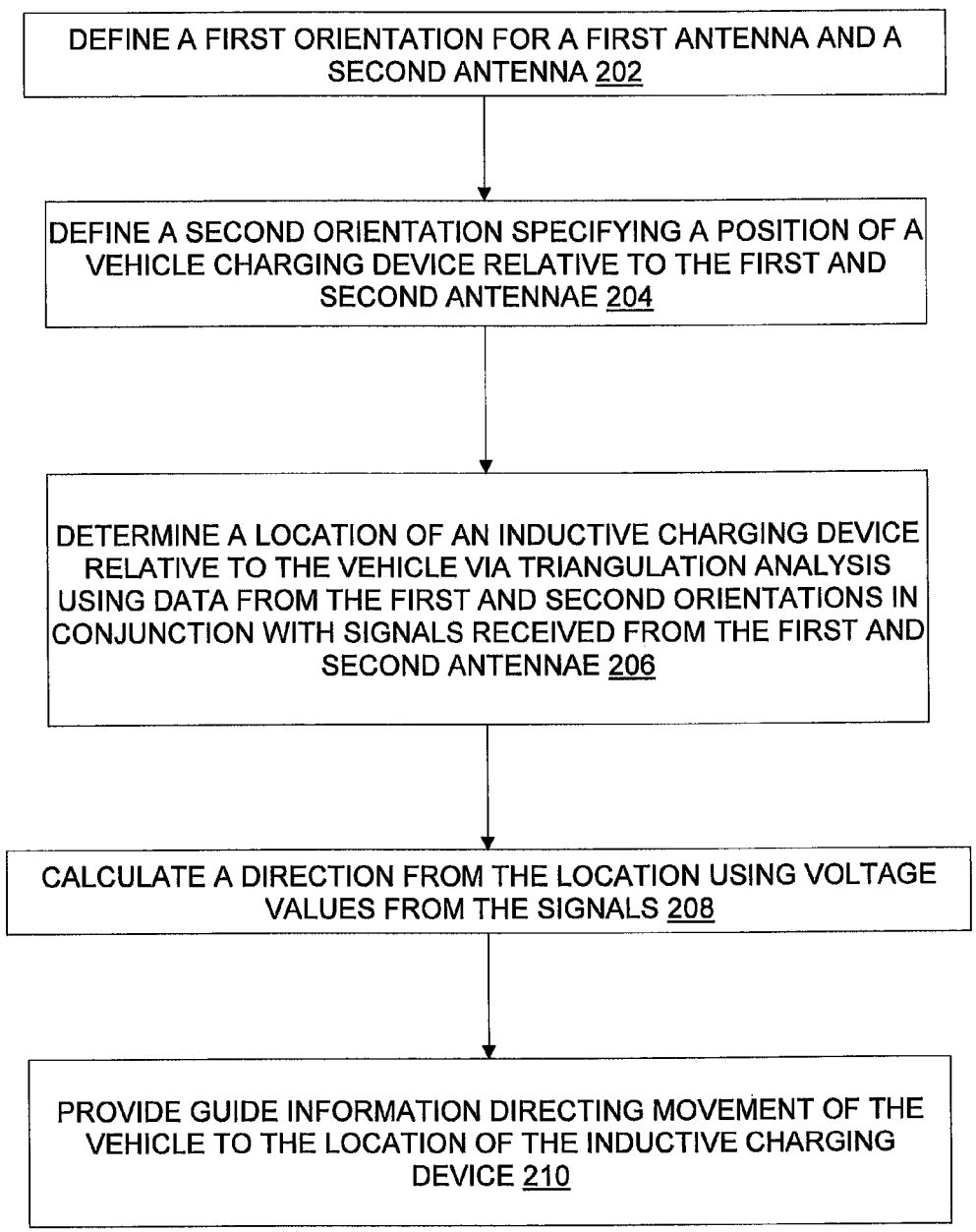
FIG. 2 is a flow diagram describing a process for implementing vehicle alignment for inductive charging in accordance with an exemplary embodiment.

Turning now to FIG. 2, a flow diagram describing a process for implementing vehicle alignment for inductive charging in accordance with an exemplary embodiment will now be described. The exemplary vehicle alignment for inductive charging processes utilize orientation information relating to two or more antennae (e.g., antenna 116A and 116B) in relation to the vehicle charging device 114 to determine a relative location of the inductive charging device 106 in order to guide the vehicle 102 toward the inductive charging device 106, and as close as possible to the inductive charging device 106, in order to realize maximum possible power transfer between the inductive charging device 106 and the vehicle charging device 114. Triangulation analysis is used to determine the location of the inductive charging device 106 by acquiring reference data from signals provided by the two or more antennae 116A and 116B, and applying the reference data to the known orientation information.

At step 202, a first orientation is defined for the first antenna (e.g., antenna 116A) and the second antenna (e.g., antenna 116B) via the controller 110. In one embodiment, the first orientation is defined whereby the first antenna 116A and the second antenna 116B are each disposed symmetrically along an axis that is perpendicular to a longitudinal axis 140 of the vehicle 102. As shown in FIG. 1, the antennae 116A and 116B are spaced equidistant 130 from a front end of the vehicle 102, and are also spaced equidistant 132 from left and right sides of the vehicle 102.

In another embodiment, the location of the antennae 116A and 116B on the vehicle 102 is not needed to perform the triangulation analyses—only the orientation between the antennae 116A and 116B on the vehicle 102 is used, since the signal data from these antennae 116A and 116B, in conjunction with the orientation information, are used to determine location information. In this embodiment, the antennae 116A and 116B may not be symmetrically aligned on the vehicle 102 (horizontally and/or vertically). Rather, a position of the first antenna 116A is defined in relation to a position of the second antenna 116B, and the control system 110 is configured to identify, and compensate for, any skew in the voltage values caused by this orientation.

At step 204, a second orientation specifying a location of the vehicle charging device 114 disposed on the vehicle 102 relative to the first antenna 116A and the second antenna 116B is defined via the controller 110. As shown in FIG. 1, for example, the vehicle charging device 114 is disposed between the antennae 116A and 116B. The location of the vehicle charging device 114 on the vehicle 102 is not needed to perform the exemplary alignment processes described herein.

Only the orientation between the antennae 116A and 116B in relation to the vehicle charging device 114 is used.

At step 206, the location of the inductive charging device 106 relative to the vehicle 102 is determined by performing triangulation analysis using data from the first orientation and the second orientation in conjunction with signals received from each of the first antenna 116A and the second antenna 116B. In an exemplary embodiment, the control system 110 analyzes voltage values received from the signals and uses the strength of the signals to determine the location. For example, if one antenna 116A transmits a signal having a voltage value greater than the voltage value of the other antenna 116B, and both antennae 116A and 116B are symmetrically aligned as described above, then the signal strength of the first antenna 116A would reflect that the inductive charging device 106 is closer to the first antenna 116A than it is to the second antenna 116B. The controller 110 uses this information to direct the vehicle 102 accordingly. If, however, the first orientation of the antennae 116A and 116B indicates they are not symmetrically aligned on the vehicle 102 as described above, the control system 110 may be configured to identify any skew in voltage values resulting from this orientation and direct the vehicle to move in the direction of the location when one of the voltage values received reaches a threshold value that compensates for the skew.

At step 208, a direction from the location is calculated via the control system 110 using voltage values from the signals, such that movement of the vehicle 102 in the calculated direction brings the vehicle charging device 114 closer to the inductive charging device 106. At step 210, the control system 110 provides guidance information to direct movement of the vehicle 102 in the direction of the location of the inductive charging device 106.

As the vehicle 102 moves in the direction of the location, the control system 110 continues to monitor the signals received from the antennae 116A and 116B. The control system 110 recalculates the direction of the vehicle 102 (e.g., using the triangulation analysis described above) based upon changes in the voltage values resulting from movement of the vehicle 102. The control system 110, likewise, continues to guide the vehicle 102 by providing guide information (e.g., turn left or right) in response to the recalculations. In one embodiment, the guide information may be in the form of a navigation instruction displayed on a display device (e.g., via the navigation system 124 of FIG. 1). Alternatively, the control system 110 may be configured to transmit a signal to the vehicle 102 activating a left directional signal or right directional signal commensurate with the guidance information. In a further embodiment, the control system 110 may be configured to transmit a signal to the vehicle 102 activating the auto-park system 126.

The control system 110 directs the vehicle 102 to discontinue movement when each of the voltage values is the same (e.g., in the case of symmetrically aligned antennae 116A and 116B) and has reached a maximum defined threshold value. Alternatively, the control system 110 directs the vehicle 102 to discontinue movement when one of the voltage values received reaches another threshold value (e.g., in the case of non-symmetrically disposed antenna 116A and 116B). For example, when the other threshold value reflects that a maximum possible power level configured for the antenna has been reached, it is determined that the vehicle charging device 114 is completely aligned with the inductive charging device 106, thereby enabling maximum inductive power transfer via the power transfer component 108. Once the alignment has been satisfied, the control system 110 may be configured to direct the inductive charging device 106 to initiate inductive charging to the vehicle charging device 114.

In an exemplary embodiment, the control system 110 may be configured to guide the vehicle 102 in a reverse direction when the vehicle 102 overshoots the location in which it is directed. For example, the control system 110 may store data values representing pairs of voltage values received from respective first and second antennae 116A and 116B as the vehicle 102 progresses in the direction of the location. Each set of voltage values is compared to earlier paired voltage values received at the control system 110 to determine whether the signal strengths are increasing or decreasing. Using this information, the control system 110 may determine that the vehicle 102 has proceeded beyond the location and direct the vehicle 102 to reverse its direction.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. A system of vehicle alignment for inductive charging, comprising:
   a control system; and
   logic configured to execute on the control system, the logic implementing a method, the method comprising:
   defining a first orientation for a first antenna and a second antenna, the first antenna and the second antenna disposed on a vehicle;
   defining a second orientation specifying a location of a vehicle charging device disposed on the vehicle relative to the first antenna and the second antenna;
   determining a location of an inductive charging device relative to the vehicle by performing triangulation analysis using data from the first orientation and the second orientation in conjunction with signals received from each of the first antenna and the second antenna;
   calculating a direction to the location using voltage values from the signals, such that movement of the vehicle in the direction brings the vehicle charging device closer to the inductive charging device; and providing guide information configured to direct movement of the vehicle in the direction of the location.

2. The system of claim 1, wherein the first antenna and the second antenna are transmission loop antennae.

3. The system of claim 1, wherein:

the first orientation comprises the first antenna and the second antenna each disposed symmetrically along an axis that is perpendicular to a longitudinal axis of the vehicle; and calculating the direction to the location comprises comparing the voltage values from each of the first antenna and the second antenna, and directing the vehicle to move in the direction of the location when the voltage value of the antenna closest to the location is greater than the voltage value of the antenna furthest away from the location.

4. The system of claim 3, wherein the logic further implements:

directing the vehicle to discontinue movement when each of the voltage values is the same and has reached a defined maximum value.

5. The system of claim 1, wherein defining the first orientation comprises:

defining a position of the first antenna in relation to a position of the second antenna;

identifying any skew in voltage values resulting from the first orientation; and directing the vehicle to move in the direction of the location when one of the voltage values received reaches a threshold value that compensates for the skew.

6. The system of claim 5, wherein the logic further implements:

directing the vehicle to discontinue movement when one of the voltage values received reaches a maximum configured power level for the one of the first antenna and the second antenna.

7. The system of claim 1, wherein the logic further implements:

monitoring voltage values received from the first antenna and the second antenna during movement of the vehicle;

recalculating the direction of the vehicle based upon changes in the voltage values resulting from movement of the vehicle; and providing guidance information to the vehicle responsive to the re-calculating.

8. The system of claim 1, wherein providing guidance information to the vehicle includes at least one of:

activating a directional signal on the vehicle corresponding to the direction in which the vehicle is guided;

displaying directional data on a navigation system of the vehicle; and directing an automated parking feature to move the vehicle in the location.

9. A method of vehicle alignment for inductive charging, comprising:

defining a first orientation for a first antenna and a second antenna, the first antenna and the second antenna disposed on a vehicle;

defining a second orientation specifying a location of a vehicle charging device disposed on the vehicle relative to the first antenna and the second antenna;

determining a location of an inductive charging device relative to the vehicle by performing triangulation analysis using data from the first orientation and the second orientation in conjunction with signals received from each of the first antenna and the second antenna;

calculating a direction to the location using voltage values from the signals, such that movement of the vehicle in the direction brings the vehicle charging device closer to the inductive charging device; and providing guide information configured to direct movement of the vehicle in the direction of the location.

10. The method of claim 9, wherein the first antenna and the second antenna are transmission loop antennae.

11. The method of claim 9, wherein:

the first orientation comprises the first antenna and the second antenna each disposed symmetrically along an axis that is perpendicular to a longitudinal axis of the vehicle; and calculating the direction to the location comprises comparing the voltage values from each of the first antenna and the second antenna, and directing the vehicle to move in the direction of the location when the voltage value of the antenna closest to the location is greater than the voltage value of the antenna furthest away from the location.

12. The method of claim 11, further comprising:

directing the vehicle to discontinue movement when each of the voltage values is the same and has reached a defined maximum value.

13. The method of claim 9, wherein defining the first orientation comprises:

defining a position of the first antenna in relation to a position of the second antenna;

identifying any skew in voltage values resulting from the first orientation; and directing the vehicle to move in the direction of the location when one of the voltage values received reaches a threshold value that compensates for the skew.

14. The method of claim 13, further comprising:

directing the vehicle to discontinue movement when one of the voltage values received reaches a maximum configured power level for the one of the first antenna and the second antenna.

15. The method of claim 9, further comprising:

monitoring voltage values received from the first antenna and the second antenna during movement of the vehicle;

recalculating the direction of the vehicle based upon changes in the voltage values resulting from movement of the vehicle; and providing guidance information to the vehicle responsive to the re-calculating.

16. A computer program product for implementing vehicle alignment for inductive charging, the computer program product comprising a storage medium with instructions encoded thereon, which when executed by a computer cause the computer to implement a method, the method comprising:

defining a first orientation for a first antenna and a second antenna, the first antenna and the second antenna disposed on a vehicle;

defining a second orientation specifying a location of a vehicle charging device disposed on the vehicle relative to the first antenna and the second antenna;

determining a location of an inductive charging device relative to the vehicle by performing triangulation analysis using data from the first orientation and the second orientation in conjunction with signals received from each of the first antenna and the second antenna;

calculating a direction to the location using voltage values from the signals, such that movement of the vehicle in the direction brings the vehicle charging device closer to the inductive charging device; and providing guide information configured to direct movement of the vehicle in the direction of the location.

17. The computer program product of claim 16, wherein the first antenna and the second antenna are transmission loop antennae.

18. The computer program product of claim 16, wherein:

the first orientation comprises the first antenna and the second antenna each disposed symmetrically along an axis that is perpendicular to a longitudinal axis of the vehicle; and calculating the direction to the location comprises comparing the voltage values from each of the first antenna and the second antenna, and directing the vehicle to move in the direction of the location when the voltage value of the antenna closest to the location is greater than the voltage value of the antenna furthest away from the location.

19. The computer program product of claim 18, wherein the method further comprises:

directing the vehicle to discontinue movement when each of the voltage values is the same and have reached a defined maximum value.

20. The computer program product of claim 1, wherein defining the first orientation comprises:

defining a position of the first antenna in relation to a position of the second antenna;

identifying any skew in voltage values resulting from the first orientation; and directing the vehicle to move in the direction of the location when one of the voltage values received reaches a threshold value that compensates for the skew.

* * * * *